United States Patent [19]

Schäfers

[11] 4,028,988
[45] June 14, 1977

[54] DOWEL

[76] Inventor: Heinrich B. Schäfers, Wachmannstrasse 22, Bremen, Germany, 2800

[22] Filed: Jan. 13, 1976

[21] Appl. No.: 648,754

[30] Foreign Application Priority Data

Jan. 18, 1975 Germany .......................... 2501925

[52] U.S. Cl. .......................................... 85/87; 85/73; 403/297; 403/290

[51] Int. Cl.² ......................................... F16B 13/00

[58] Field of Search ............... 403/297, 290; 85/63, 85/67, 72, 76, 79, 82, 83, 86, 87, 88

[56] References Cited

UNITED STATES PATENTS 1,817,790  8/1931  Whiffen .................................. 85/63
2,110,053  3/1938  Phillips ................................... 85/63

FOREIGN PATENTS OR APPLICATIONS 2,114,036  1972  Germany .......................... 403/297
4,501  1893  Sweden ................................. 85/87

Primary Examiner—Andrew V. Kundrat
Attorney, Agent, or Firm—Wigman & Cohen

[57] ABSTRACT

A dowel for use in concrete and lightweight building bricks and boards is disclosed. The dowel comprises pressure elements, a spreading element for the pressure elements and a threaded bolt surrounded by a head element. The head element, and preferably the pressure elements and/or the spreading element are made from artificial stone, such as a fine-textured concrete or ceramic material.

5 Claims, 2 Drawing Figures

DOWEL

BACKGROUND OF THE INVENTION

The invention relates to a dowel for use in aerated concrete and porous concrete as well as in light weight building bricks and boards, said dowel having pressure elements, a clamping cone and a threaded bolt which is surounded by a head element, one end face to said head element bearing against said pressure elements while a tightening nut on the bolt bears against that side of the head element which is remote from the pressure elements.

Known dowels of this kind are made of a metal or plastics material. It is also known to provide a spiral on dowels of this kind. When these known dowels are used, the material in which they are embedded is very often destroyed by the pressure exerted on the walls of the hole in which they are inserted.

SUMMARY AND OBJECTS OF THE INVENTION

It is an object of the present invention to provide a dowel which can be produced at much less cost than the known dowels and in which the risk of destruction of the surrounding material is reduced.

According to the invention, this problem is solved in a dowel of the kind defined above by making at least the head element and preferably also the pressure elements and/or the clamping cone of an artificial stone, e.g. concrete or ceramics, preferably of fine textured concrete. Since the head element and pressure elements of a dowel are subjected only to pressure when in use and since artificial stones are able to withstand very high pressures, the dowels according to the invention can be fixed very firmly into a closely fitting bore in known manner. By making the dowel elements of artificial stone and in particular of fine textured concrete it is possible to manufacture the dowels at much less cost than has hitherto been possible. Since dowels are mass produced articles, the reduction in cost achieved by means of the invention is of major economic importance.

BRIEF DESCRIPTION OF THE DRAWINGS

The invention will now be explained by means of a detailed description of an example of an embodiment of the invention illustrated in the drawings.

BRIEF DESCRIPTION OF A PREFERRED EMBODIMENT

Figure 1:
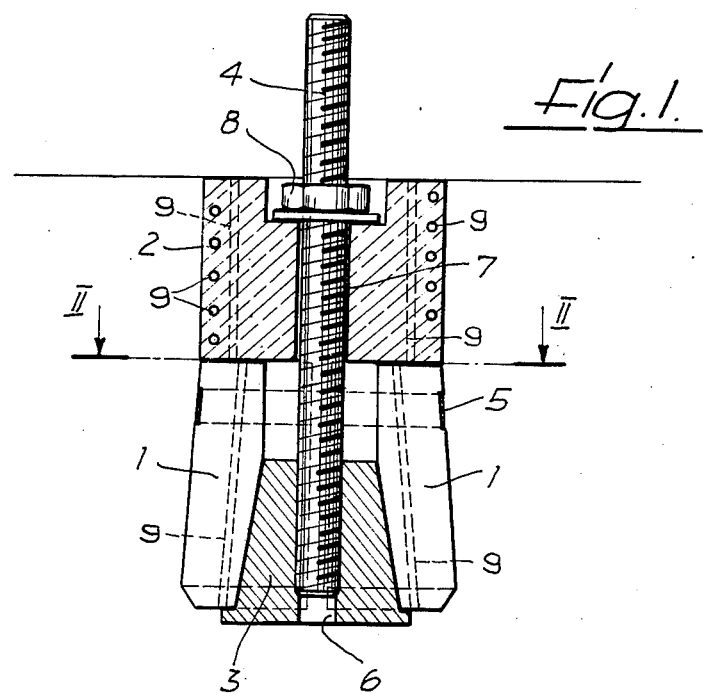
FIG. 1 is an axial section through the embodiment in its tightened state.
Figure 2:
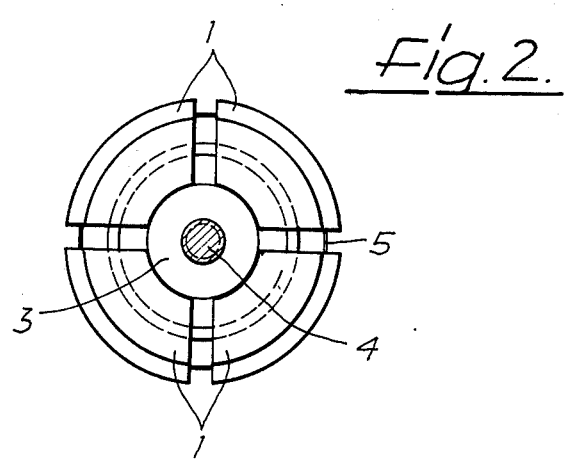
FIG. 2 is a section taken on the line II—II in FIG. 1.

The example of a dowel according to the invention illustrated in the drawing comprises a plurality of pressure elements 1 which are made of artificial stone, e.g. of concrete or ceramics, preferably of fine textured concrete, and are held around a threaded metal bolt 4 by a supporting band 5. A metal cone 3 has an axial tapped bore 6 for the bolt 4, which extends through an axial bore 7 of a head element 2 which also is made of artificial stone, e.g. of concrete or ceramics, preferably of fine textured concrete. The pressure elements 1 bear against one end face of said head element 2. A tightening nut 8 is placed on the external thread of the bolt 4 from the end remote from the cone 3. The said nut 8 bears against the side of the head element 2 remote from the pressure elements 1.

The clamping elements 1 are designed so that when assembled they can be introduced into the bore of a supporting structure. The head element 2 has the same diameter as this bore. The clamping elements 1 are pressed against the walls of the bore by spreading them with the cone 3 by means of the bolt 4 and/or the nut 8. If a fairly hard supporting material is used, it is advisably to make the bore conical.

When the dowel described above is inserted in a structure made of a porous material, the material is almost invariably compressed due to the tightening of the cone 3 by means of the screw 4 and/or the nut 8, so that a conical fully weight bearing anchoring element is obtained.

In a further embodiment of the invention also the cone 3 is made of artificial stone, e.g. of concrete or ceramics, preferably of fine textured concrete, and pressed on the thread of the bolt 4 so that the cone 3 and the bolt 4 forms an integral body.

The artificial stone, preferably the concrete, of the pressure elements 1 and/or the head element 2 and/or the cone 3 may be reinforced by a metal wires 9.

If necessary, a builder's adhesive may be used for inserting the dowel.

What I claim is:

1. In a dowel comprising a threaded bolt having an inner and outer end, a head element surrounding said bolt and having two ends which face to said inner and outer ends of said bolt, respectively, a spreading element which surrounds said bolt and is connected to said bolt adjacent said inner end, said spreading element having a tapered end which faces said outer end of said bolt, at least one pressure element arranged around said bolt between said head element and said spreading element and a nut mounted on said bolt near said end of said head element facing said outer end of said bolt for shifting said pressure element on said spreading element, the improvement comprising said head element being made of artificial stone.

2. The improvement according to claim 1, in which said pressure element is also made of artificial stone.

3. The improvement according to claim 1, in which said spreading element is also made of artificial stone.

4. A dowel comprising a threaded bolt having an inner and an outer end, a head element surrounding said bolt and having two ends which face toward said inner and outer ends respectively of said bolt, said head element being made of artificial stone, a cone, which surrounds said bolt and is connected to said bolt adjacent said inner end, said cone having a tapered end which faces said outer end of said bolt, pressure elements arranged around said bolt between said head element and said cone, said pressure elements being made of artificial stone, and a nut mounted on said bolt near the end of said head element facing said outer end of said bolt for shifting said pressure elements on said cone.

5. A dowel according to claim 4, wherein said cone is made of artificial stone.

* * * * *